United States Patent [19]

Silbermann

[11] 4,268,890
[45] May 19, 1981

[54] BREAKER COMBINATION FOR BUS BAR INSTALLATIONS

[75] Inventor: Erich Silbermann, Bubenreuth, Fed. Rep. of Germany

[73] Assignee: Siemens Aktiengesellschaft, Berlin and Munich, Fed. Rep. of Germany

[21] Appl. No.: 25,562

[22] Filed: Mar. 30, 1979

[30] Foreign Application Priority Data

Apr. 28, 1978 [DE] Fed. Rep. of Germany ....... 2818914

[51] Int. Cl.³ .............................................. H02B 1/04
[52] U.S. Cl. ................................... 361/335; 361/341;
200/8 A; 200/153 S; 200/156
[58] Field of Search ............... 361/335, 334, 341, 425;
200/8 R, 8 A, 9, 18, 24, 48 R, 153 E, 153 S, 155 R, 156, 284, 302, 145, 148 R, 148 B

[56] References Cited

U.S. PATENT DOCUMENTS

| | | | |
|---|---|---|---|
| 2,503,888 | 4/1950 | Schultz | 200/145 |
| 3,247,348 | 4/1966 | Forwald | 200/145 |
| 3,260,804 | 7/1966 | Buzzi | 200/8 R |
| 3,263,033 | 7/1966 | Metzger | 200/8 A |
| 3,267,244 | 8/1966 | Schultz | 200/8 A |
| 3,697,981 | 10/1972 | Harkins | 200/8 A |

FOREIGN PATENT DOCUMENTS

1943099 3/1971 Fed. Rep. of Germany.

Primary Examiner—Gerald P. Tolin
Attorney, Agent, or Firm—Kenyon & Kenyon

[57] ABSTRACT

A breaker combination, for use in bus bar installations for connecting at least one bus bar with at least one branch, includes an encapsulating tube and a rotatable switching tube axially disposed in the tube. Stationary counter-contacts arranged on the inner periphery of the tube, are connected with a bus bar or a branch. The switching tube carries external contact studs for making electrical connection with the counter-contacts which also are connected to the poles of a power circuit breaker lying inside the switching tube. This integrated construction provides an especially compact arrangement and simplified locking between the drives for the power circuit breaker and for the isolating or switching contacts.

16 Claims, 21 Drawing Figures

BREAKER COMBINATION FOR BUS BAR INSTALLATIONS

BACKGROUND OF THE INVENTION

1. Field of the Invention

This invention relates to a breaker combination for bus bar installations for connecting at least one bus bar to at least one branch. More specifically, the breaker combination consists, for each phase of the bus bar installation, of a tube having a rotatable shaft arranged axially in the tube, stationary counter-contacts supported on the inner circumference of the tube each of which is connected with one phase of a bus bar or branch, and contact studs carried on the shaft and rotatable to establish electrical connection with associated counter-contacts.

2. Discussion of the Prior Art

An example of a breaker combination of this kind, in which multi-pole load isolation points are used for connecting a transformer to a network ring circuit, is described in German Patent Application 19 43 099. There a transformer terminal and the two terminals of the network ring circuit are connected to contacts which lie on the inner periphery of a disk-shaped housing. A rotatable shaft is disposed in an axial direction in the housing and is non-rotationally connected with a T-shaped contact. The T-shaped contact can be conductively connected with the contacts at the inner periphery of the flat cylindrical housing, the contact points being designed as load isolation points. A separate disk-shaped housing for each phase of the ring circuit is provided, and the housings for several phases can be combined coaxially to form a reversing switch set. With this arrangement it becomes possible, by rotation of the T-shaped contact, to connect a transformer selectively to different cables of a network ring circuit loop and to connect these cables with one another. This arrangement is designed for a specific purpose and cannot be used for general switching tasks in bus bar systems because impermissible intermediate positions would occur when switching from one position to another. Since the switching gaps are formed as load break gaps, separate power circuit breakers would have to be provided for use in bus bar installations. Also separate grounding arrangements are required.

It is an object of the present invention to provide a breaker combination of the kind described above for bus bar installations in which the power circuit breaker is integrated in one housing along with the break gaps.

BRIEF DESCRIPTION OF THE INVENTION

According to the invention, this problem is solved by providing a shaft which functions as a switching tube and which contains a power circuit breaker; each terminal of the power circuit breaker being electrically conductively connected with a contact stud.

This integrated construction results in an especially compact arrangement which provides simple possibilities for locking between the actuation of the power circuit breaker and the isolating or switching contacts.

Thus, a common tube is provided for switching at least some of the phases of the bar systems as well as for serving as a power circuit breaker for switching all phases. Thereby the construction is further simplified and becomes still more compact.

In a breaker combination of the above mentioned kind, where the contact studs belonging to different phases of the connected bus bar system are axially spaced on a common shaft, two associated contact studs are advantageously provided for each phase of the bar system which are placed diametrically opposite each other on the switching tube, each pair of contact studs associated with a phase being conductively connectable via a switching gap of the power circuit breaker. This results in a particularly simple possibility for switching and a simple design for the power circuit breaker.

Further, each stud of a pair of contact studs associated with a phase can be electrically conductively connected with a grounding stud, each grounding contact stud being axially spaced on the switching tube from the respective contact stud, there being arranged on the inner periphery of the tube a grounded counter-contact for each phase to which the appropriate grounding contact stud is electrically connected by rotation of the switching tube. In this way, branches and bus bars may be grounded simply and without additional devices. The integrated arrangement makes possible an interlocking action between the grounding device and the break gaps or, respectively, of the power circuit breaker, without special expense.

According to the invention, in a breaker combination intended for use with a simplex bus bar and a branch, the counter-contacts are designed as sector pieces spaced from each other in circumferential direction, there being three counter-contacts per phase. Thus, one counter-contact is connected with each phase of the bus bar, one counter-contact with each phase of the branch, and one contact for each phase is connected to ground. The length and relative position of the counter-contacts and the form of the contact studs is so adjusted that, depending on the position of the switching tube, the branch is electrically connectable to the bus bar or to ground, or the bus bar is connectible to ground, by closing the power circuit breaker. Thus, all switching positions required for a simplex bus bar are possible.

In a breaker combination of the above-mentioned kind for a duplex bus bar and a branch, in which the counter-contacts are designed as sector pieces spaced from each other in circumferential direction, there may be six counter-contacts per phase, one counter-contact each being connected with one phase of the first bus bar, one counter-contact each with the same phase of the second bus bar, one counter-contact each with the same phase of the branch, and three counter-contacts to ground. One grounded counter-contact for each phase is located between the counter-contact connected with the branch and two counter-contacts connected with the bus bars, and a further grounded counter-contact is located between the counter-contacts connected to the two bus bars. The length and relative position of the counter-contacts and the form of the contact studs are so adjusted that, depending on the position of the switching tube, the phases of the branch are conductively connectable selectively with the respective phase of the first bus bar or of the second bus bar, or the phases of the first or second bus bar or of the branch with the respective opposite grounded counter-contacts, by closing the power circuit breaker. Thereby all switching positions required for duplex bus bars can be established. With this construction of the breaker combination, an interruption occurs when switching the branch between the two bus bars.

In a breaker combination for a duplex bus bar and a branch, where the counter-contacts are designed as sector pieces spaced from each other in circumferential direction, there may be a five counter-contacts per phase, one counter-contact each being connected with a phase of the first bus bar, one counter-contact each with the same phase of the second bus bar, one counter-contact each with the same phase of the branch, and two counter-contacts to ground. Of the two grounded counter-contacts per phase, a first grounded counter-contact lies between the counter-contact connected with the branch and the counter-contact connected with the first bus bar, and a second grounded counter-contact lies between the counter-contact connected with the branch and the counter-contact connected with the second bus bar. The length and position of the counter-contacts and the form of the contact studs are so related to each other that, depending on the position of the switching tube, the phases of the branch are conductively connectable with the respective phases of the first bus bar, of the second bus bar or to ground, or the phases of the first or second bus bar to ground, by closing the power circuit breaker. One of each pair of contact studs associated with a phase is designed as a sector piece and this contact stud is of such circumferential length that it is connectable simultaneously with the respective phases of both bus bars. Thereby, uninterrupted switching of the branch between two bus bars is made possible.

For construction of the power circuit breaker, each contact stud is electrically connected with a fixed switching contact on the interior of the switching tube. An insulated switching rod, movable in its longitudinal direction, is axially mounted in the switching tube. The rod carries a contact bridge for pairs of switching contacts associated with a phase. This power circuit breaker can be actuated with an axial switching movement.

As an alternative construction of the power circuit breaker, one of two contact studs associated with a phase is electrically connected to a fixed switching contact and the other to a movable switching contact inside the switching tube. Each movable switching contact is fastened to an insulated switching rod axially arranged in the switching tube and movable in its longitudinal direction. With this alternative construction of the power circuit breaker, the switching movement is also carried out in the axial direction.

The switching tube may be hermetically encapsulated and the switching rod brought out of the switching tube via a bellows. The bellows provide an effective seal of the switching tube while, at the same time permitting the axial switching movement to occur. Thus, the switching tube can, for example, contain a vacuum and can therefore be constructed with especially small dimensions.

The switching tube advantageously has an actuating lug or shaft extending out of the tube in an axial direction and rotatably mounted. The switching tube and its attached contact studs can be rotated by the lug and thus the connected branch can be switched or isolated.

The switching actuator rod is advantageously brought out of the switching tube at the end opposite the actuating lug, and includes a coupling or clutch which transmits only axial movement, the coupling being connected with an actuating rod brought out of the tube and mounted for displacement in the axial direction. The switching rod is displaced by this actuating rod and, thereby, the power circuit breaker is actuated. Because of the built-in coupling, the actuating rod executes only axial movements.

In the structure provided, the outer tube can be encapsulated hermetically and filled with $SF_6$ gas. Thus, an especially compact construction, protected against ambient influences, is made possible, which offers special advantages when the bus bars are also designed in $SF_6$ technique.

DETAILED DESCRIPTION OF THE INVENTION

Figure 1:
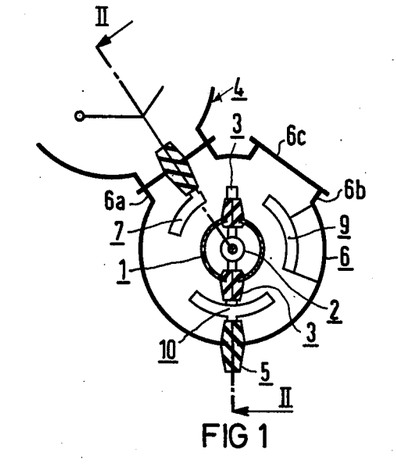
FIG. 1 shows an end view, taken in cross-section along lines II of FIG. 2, of a breaker having a three-phase simplex bus bar with a branch according to the invention.
Figure 2:
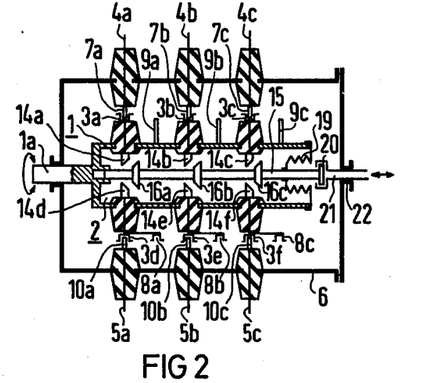
FIG. 2 is a side view, in cross-section, of the breaker of FIG. 1.

FIGS. 1 to 5 show a breaker combination for a three-phase simplex bus bar with a branch, the bus bar and breaker combination being designed in $SF_6$ technique. FIG. 1 shows a section through the breaker combination in radial direction, while FIG. 2 shows a section in axial direction. Both figures will be explained jointly in the following:

On the inner periphery of a tubular enclosure 6, three stationary counter-contacts per phase, 7a to 7c, 9a to 9c, and 10a to 10c, are arranged. The counter-contacts 7a to 7c are supported from tube 6 on insulators and are connected with the three phases 4a to 4c constituting bus bar 4. The counter-contacts 10a to 10c are also supported from tube 6 on insulators and are connected with the three phases 5a to 5c constituting branch 5. Counter-contacts 9a to 9c are connected directly to tube 6, which is grounded. Of the counter-contacts 7a to 7c and 10a to 10c, those belonging to a given phase lie in a plane normal to the axis of the tube; each grounded counter-contacts 9a to 9c is axially spaced from its associated phase. The counter-contacts 7a to 7c, 9a to 9c and 10a to 10c are formed as sector pieces and are spaced from each other in the circumferential direction. The counter-contacts 7a to 7c connected with bus bar 4, the counter-contacts 10a to 10c connected with branch 5, and the counter-contacts 9a to 9c connected to ground via tube 6 thus lie in different segments of tube 6, which is conceptually divided into three equal segments.

A rotatable switching tube 1 is centered in tube 6. Switching tube 1 has an actuating lug or shaft 1a of smaller outer diameter than the switching tube 1 which is brought out of tube 6, being rotatably mounted so that it can turn switching tube 1. A self-lock drive, not shown, may be connected to the lug for this purpose.

Contact studs 3a to 3f are carried on the outside of switching tube 1, there being two, diametrically opposite, contact studs for each phase. Each pair of contact studs 3a and 3d, 3b and 3e, and 3c and 3f belongs to a different phase and is axially spaced from the others, and contact studs 3d to 3f carry, and are each electrically connected to grounding contact studs 8a to 8c, respectively, each of which is axially spaced from its associated contact stud. Counter-contacts 7, 9 and 10 are arranged so that, depending on the position of switching tube 1, grounding contact studs 8a to 8c are conductively connected with grounded counter-contacts 9a to 9c, and contact studs 3a to 3f, with the counter-contacts 7a to 7c or 10 to 10c. The contact surfaces between the counter-contacts and the contact studs or, appropriately, the grounding contact studs are designed as wiper contacts, with the contact studs and the grounding contact studs, as the case may be, resiliently engaging the opposite surfaces of the sector-shaped counter-contacts. The switching gaps between the contact studs and counter-contacts are not power switching gaps, but break gaps; the wiper contacts can therefore be constructed at little expense.

The circumferential distances between counter-contacts 7, 9, 10 are made large enough that an individual contact studs 3a to 3f cannot bridge two adjacent counter-contacts during rotation of switching tube 1.

Each contact stud 3a to 3f is electrically connected to a respective switching contact 14a to 14f of power circuit breaker 2 lying in switching tube 1. Switching tube 1 is encapsulated hermetically and, for example, may be evacuated. Each phase has a power switching gap, consisting of two switching contacts 14a to 14c, 14d to 14f, and a contact bridge 16a to 16c. Each of the three contact bridges 16a to 16c for each of the three phases is firmly mounted on an insulated switching rod 15. Axial movement of switching rod 15 in the actuating direction connects switching contacts 14a to 14c with switching contacts 14d to 14f via contact bridges 16a to 16c. Thereby, the pairs of contact studs 3a to 3f in a given phase are electrically connected. Likewise, each contact stud 3a or 3c is connected to its respective grounding contact stud 8a to 8c. Depending on the position of the switching tube, this results, as will be discussed below, in a conductive connection between corresponding phases of the bus bar and the branch or ground.

Switching rod 15 is centered in switching tube 1 and mounted for axial movement therein. It is brought out of switching tube 1 at the end opposite actuating lug 1a, being hermetically sealed through bellows 19. Switching rod 15 is further connected, via coupling 20, to actuating rod 21, which is brought out of tube 6 through an hermetic seal and which is mounted for displacement in the axial direction. Actuation of power circuit breaker 2 is brought about by axial motion of rod 21, since coupling 20 is designed so that it transmits only axial movements. Thus, when switching tube 1 is rotated, actuating rod 21 is not rotated with it. The bearing 22 in tube 6 through which actuating rod 21 passes need only be made gastight for axial movements.

Figure 3:
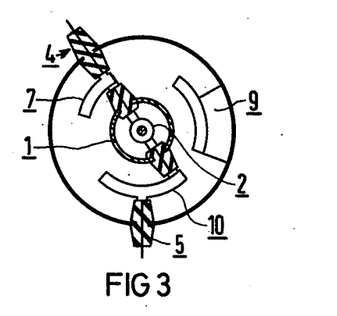
FIGS. 3, 4 and 5 illustrate various connections being made by the breaker of FIG. 1.

FIGS. 1, 3, 4 and 5 show the various switching positions used in a simplex bus bar installation employing the teachings of the invention. In FIG. 1, branch 5 is shown disconnected from bus bar 4, and neither branch 5 nor bus bar 4 are grounded. If branch 5 is now to be connected with bus bar 4, power circuit breaker 2 is first opened by means of actuating rod 21. Then, using actuating lug 1a, switching tube 1 is rotated counterclockwise until contact studs 3a to 3c are connected with counter-contacts 7a to 7c of bus bar 4 and contact studs 3d to 3f with counter-contacts 10a to 10c of branch 5. Thereafter, power circuit breaker 2 is closed again, so that now bus bar 4 is in three-phase connection with branch 5. FIG. 3 shows this state.

Figure 4:
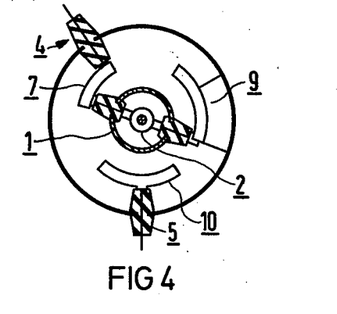

As shown in FIG. 4, when branch 5 is to be isolated and bus bar 4 grounded, this can be effected from any position of switching tube 2 by first opening power circuit breaker 2, and then rotating switching tube 1 until contact studs 3a to 3c are connected with counter-contacts 7a to 7c and grounding contact studs 8a to 8c are connected with grounded counter-contacts 9a to 9c. Thereafter power circuit breaker 2 is closed again.

Figure 5:
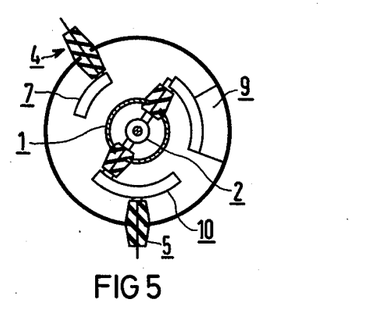

Lastly, FIG. 5 shows the state of the breaker combination in which branch 5 is isolated from bus bar 4 and grounded. To this end, first power circuit breaker 2 is, first, opened and switching tube 1 rotated by shaft 1a until contact studs 3a to 3c are connected with counter-contacts 10a to 10c and grounding contact studs 8a to 8c with grounded counter-contacts 9a to 9c. Then power circuit breaker 2 is closed again.

With the breaker combination according to the invention, therefore, all the switching states required for a simplex bus bar can be established in a simple manner without the occurrence of undesired intermediate switching positions. Neither separate isolating switches nor grounding devices are necessary. To prevent rotation of switching tube 1 while power circuit breaker 2 is closed, or actuation of power circuit breaker 2 before switching tube 1 has reached a defined switching position, a lock, not shown in the figures, is provided between the actuating device of power circuit breaker 2 and the rotating device for switching tube 1. The lock for the structures made according to the teachings of the invention is easier to construct and, hence, also safer in operation than that in conventional medium high voltage switching installations, since the switching device and the power circuit breaker are integrated in one housing and only two drives, the power circuit breaker drive and the switching tube drive, need be locked relative to each other. In conventional medium high voltage switching installations, the power circuit breakers, isolating switches and grounding switches may be located far apart, requiring longer rod systems or expensive electrical locking devices. Besides the power circuit breaker, each isolating switch and each grounding switch have separate drives, which all must be locked relative to each other.

It is a feature of the invention that, because of the integrated assembly of power circuit breaker 2, the entire breaker combination is very compact. By filling tube 6 with $SF_6$ gas in the illustrative example of FIGS. 1 to 5, and by using a vacuum switching tube as switching tube 1, a particularly compact form of construction is obtained which is particularly advantageous in combination with $SF_6$ bus bars. Because of the encapsulated construction, the breaker combination is removed from all harmful ambient influences. The $SF_6$ switching gaps and the vacuum tube require practically no maintenance.

By using the breaker combination taught by the invention, only one setting drive is needed for switching tube 1 and one drive for power circuit breaker 2 in order to provide all required switching positions of the bus bars and branch, including the grounding positions. Conventional medium high voltage installations require separate drives for the power circuit breaker, for each isolating switch, and possibly, for each grounding switch. For a breaker combination built in accordance with the invention, therefore, a further saving of material and space results, as compared with conventional medium high voltage installations. In addition, low-cost remote actuation may be simply achieved.

The described arrangement has only few seal points, this being of particular advantage for installations insulated with SF$_6$ or vacuums. In the breaker combination of the invention, grounding of the bus bars and of the branch occurs via power circuit breaker 2. Upon inadvertent grounding of a live bus bar or branch, the preceding power circuit breaker is triggered upon connection of the power circuit breaker 2. Therefore, neither the operating personnel nor the installation is endangered in this case. Since power circuit breaker 2 can withstand a large number of switching operations in short circuit without damage, it need not be replaced after a single switching operation in short-circuit, as is the case, for instance, with so-called grounding short-circuiters.

Figure 6:
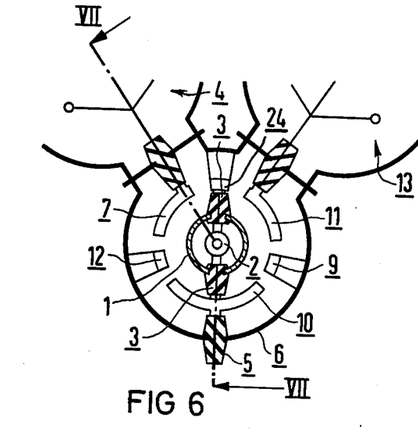
FIG. 6 shows an end view, taken in cross-section along lines VII of FIG. 7, of a breaker for use in duplex bus bars and providing for interruption during switching.
Figure 7:
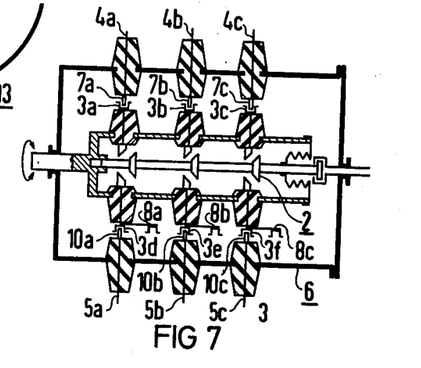
FIG. 7 is a side view, in cross-section, of the breaker of FIG. 6.

The breaker combination of the invention can be expanded in a simple manner for use in duplex bus bar installations. Thus, the breaker of FIG. 1 is shown with a flange 6b on an aperture which can be used for attachment of a second bus bar; the flanged opening is closed in FIG. 1 by means of cover 6c. FIGS. 6 to 12 show a breaker combination for use in duplex bus bar installations with interruption during switching. FIG. 6 shows a section through the breaker combination in the radial direction and FIG. 7 shows a section in the axial direction. As FIGS. 6 and 7 show, for duplex bus bar installations with interruption during switching, the same switching tube 1 with the same contact studs 3a to 3f can be used as were used in FIG. 1. The breaker combination for duplex bus bar installations differs from that for simplex bus bar installations only in the arrangement of counter-contacts 7a to 7c, 9a to 9c, 10c to 10c, 11a to 11c, 12a to 12c, and 24a to 24c. The three phases 4a to 4c of bus bar 4 are connected with counter-contacts 7a to 7c and the three phases 5a to 5c of branch 5, with the counter-contacts 10a to 10c in tube 6. Positioned between all the counter-contacts of bus bar 4, of bus bar 13, and of branch 5 there are counter-contacts 9a to 9c, 12a to 12c and 24a to 24c, all of which are electrically connected to grounded tube 6. Hence, each of the counter-contacts connected with bus bars 4 and 13 or with branch 5 is diametrically opposite a grounded counter-contact; each of these counter-contacts can therefore be grounded by means power circuit breaker 2. Grounded counter-contacts 12a to 12c, 9a to 9c and 24a and 24c associated with a given phase lie, respectively, in a plane normal to the axis of tube 6, each of these planes being axially displaced from the planes of the counter-contacts 7a to 7c, 11a to 11c, 5a to 5c associated with the same phase.

Figure 8:
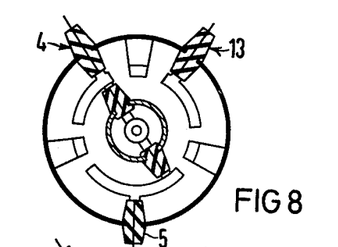
FIGS. 8 to 12 show the structure of FIGS. 6 and 7 in various switching positions.
Figure 9:
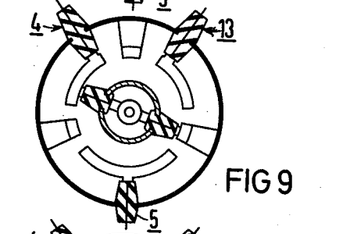
Figure 10:
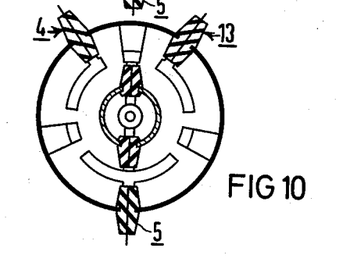
Figure 11:
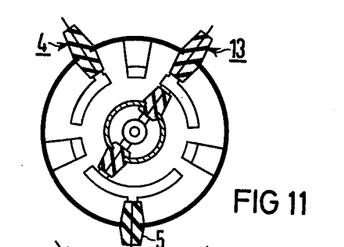
Figure 12:
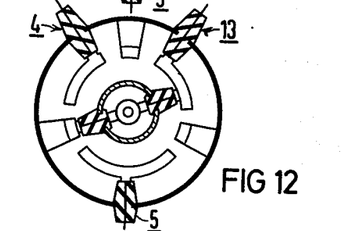
Figure 13:
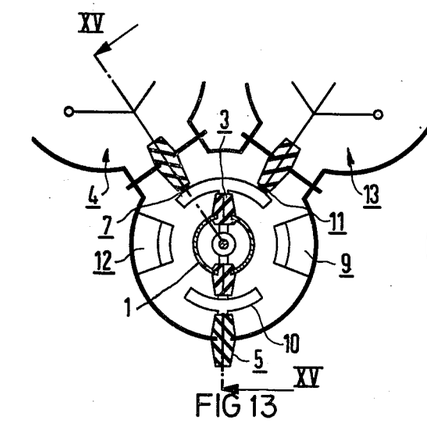
FIG. 13 shows an end view, taken in cross-section along lines XV of FIG. 14, of a breaker for use in duplex bus bars with uninterrupted switching between bars.

FIGS. 6 and 8 to 12 show the various switching positions used, according to the invention, for a duplex bus bar installation having interruption during switching. In FIG. 6, bus bars 4, 13 and branch 10 are separated from each other without grounding. In FIG. 8, bus bar 4 is connected with branch 5. In FIG. 9, branch 5 is isolated and bus bar 4 is grounded. In FIG. 10, the two bus bars 4 and 13 are isolated and branch 5 is grounded. In FIG. 11, branch 5 is connected to bus bar 13. In FIG. 12, branch 5 is isolated and bus bar 6 is grounded. In FIG. 13 both bus bars are isolated and branch 5 is grounded. The transition between the individual switching positions is accomplished, as in the breaker combination for simplex bus bars, by opening power circuit breaker 2, rotating switching tube 1, and closing power circuit breaker 2. With this illustrative breaker combination of the invention, therefore, it is again possible to obtain all switching positions necessary in a duplex bus bar, with interruption during switching, but without separate isolating switches or grounding devices.

Figure 14:
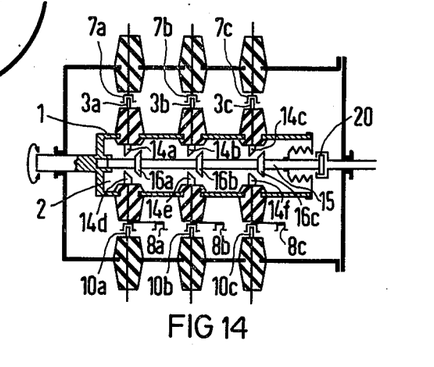
FIG. 14 is a side view, in cross-section, of the breaker of FIG. 13.
Figure 15:
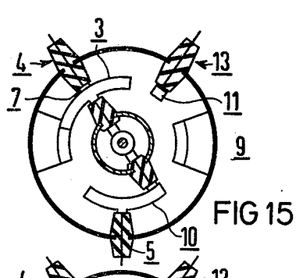
FIGS. 15 to 20 show the structure of FIGS. 14 and 15 in various switching positions.
Figure 16:
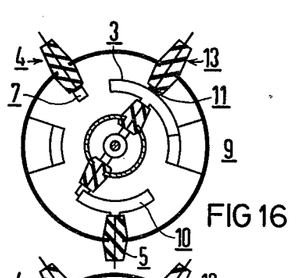

FIGS. 13 to 20 show a breaker combination for duplex bus bar installations with uninterrupted switching between the two bus bars. As FIGS. 13 and 14 show, the difference from the breaker combination for duplex bus bars having interruption during switching resides in contact studs 3a to 3c being formed as flat sector pieces, while counter-contacts 7a to 7c and 11a to 11c are formed as contact fingers which resiliently engage the sides of the contact studs. Also, there are only two grounded counter-contacts 9a to 9c and 12a to 12c per phase; the grounded counter-contacts 24a to 24c of the previously described design are obviated. The angle subtended by sector-shaped contact studs 3a to 3c is such that each contact stud 3a to 3c can be connected simultaneously with the respective phases of both bus bars 4 and 13. The installation also must contain a coupling switch (not shown) for connecting the two bus bars 4 and 13. Uninterrupted switching between two bus bars will be explained with reference to FIGS. 13, 15 and 16. In the switching position shown in FIG. 15, branch 5 is connected to bus bar 4. When branch 5 is to be connected with bus bar 13, the coupling switch present in the installation is first closed. Thereafter, switching tube 1 is rotated clockwise without opening power circuit breaker 2. Branch 5 is then connected with both bus bars 4 and 13 in an intermediate position, as shown in FIG. 13. Switching tube 1 is rotated further to the position shown in FIG. 16, where, finally, contact studs 3a to 3c are connected only to bus bar 13. The coupling switch is then opened again; branch 5 has thus been switched from bus bar 4 to bus bar 13 without interruption.

Figure 17:
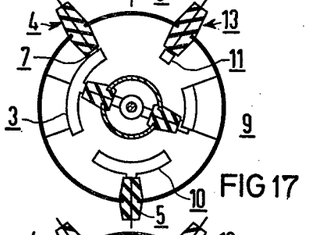
Figure 18:
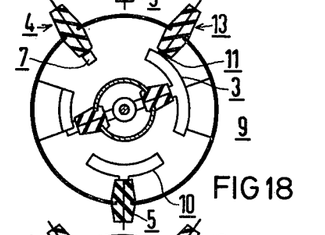
Figure 19:
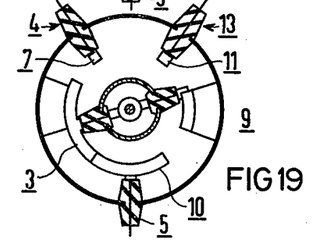
Figure 20:
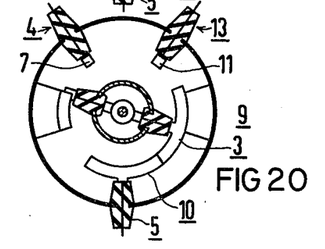

In the switching position of FIG. 17, bus bar 4 is grounded as shown in FIG. 9 and branch 5 is isolated. In the switching position of FIG. 18, bus bar 13 is grounded, as in FIG. 12, and branch 5 is isolated. Finally, in the switching positions of FIGS. 19 and 20, branch 5 is grounded as in FIGS. 10 and 13 and both bus bars 4 and 13 are isolated. Since contact studs 3a to 3c are formed as sector pieces, studs 3a to 3c strike against the sides of counter-contacts 10a to 10c in the switching positions as shown in FIGS. 19 and 20. To improve the contact, for example, at counter-contacts 10a to 10c, contact clamps not shown in the drawings may be provided at the contact points, the clamps being spring-supported on both sides for making lateral engagement with contact studs 3a to 3c.

As the preceding designs show, by means of the breaker combination of the invention, all switching positions needed for duplex bus bars during switching can be established both with and without interruption. Also, in the application to duplex bus bar installations, one drive for switching and grounding and one drive for the power circuit breaker is sufficient. As was the case in the breaker combination for simplex bus bar installations, simple locking between the actuation of the power circuit breaker and the rotation of the switching tube 1 can again be utilized here, because of the integrated construction.

FIGS. 1 to 20 show that the same components can be used for breaker combinations in both simplex and duplex bus bar installations, with and without interruption during switching. In particular, switching tube 1, power circuit breaker 2, and tube 6 are the same for simplex and duplex bus bars. This makes for especially expedient and low-cost manufacture with special advantages too, in keeping a simple stock of spare parts.

Figure 21:
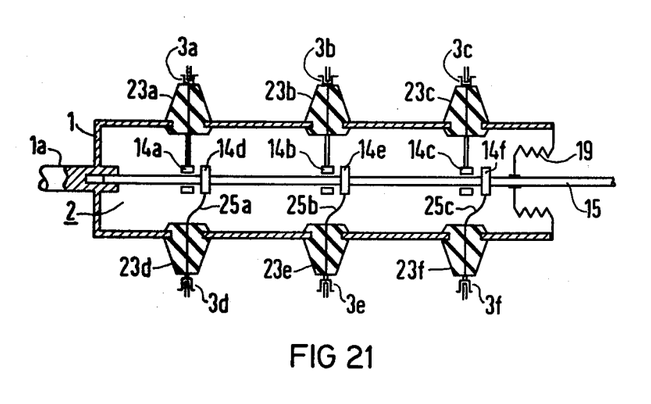
FIG. 21 is a view, in cross-section, of an alternate embodiment of the power circuit breaker of the invention.

Lastly, FIG. 21 shows a second form of construction of power circuit breaker 2. Here contact studs 3a to 3f are again extended into the interior of switching tube 1 via insulators 23a to 23f. Switching tube 1 is evacuated. Contacts studs 3a to 3c are connected with fixed switching contacts 14a to 14c in switching tube 1. Contact studs 3d to 3f are connected with switching contacts 14d to 14f via flexible lines 25a to 25c. Switching contacts 14d to 14f are fastened to insulated switching rod 15 and are movable with it in axial direction. Switching rod 15 is passed through central openings in switching contacts 14a to 14c. Tube 1 containing the switching rod 15 is sealed by means of bellows 19.

In still another embodiment, either the switching rod or fixed switching contacts 14a to 14c are not centered in the tube. In this case it is not necessary to pass switching rod 15 through bores in fixed contacts 14a to 14c. It is possible, also, to install any desired elongated and compactly built power circuit breaker in the switching tube 1.

What is claimed is:

1. In a breaker combination for connecting at least one bus bar with at least one branch in a plural phase bus bar installation, the breaker combination having, in at least one phase of the installation,
a fixed tube and a rotatable shaft axially disposed in the tube; stationary counter-contacts disposed around the inner circumference of the tube, there being at least one counter-contact connected with one bus bar and one counter-contact connected with a branch; and
at least two contact studs disposed on an arc of a circle on the shaft and an electrical interconnection between the studs, whereby rotation of the shaft will electrically connect at least one contact stud to one counter-contact, the improvement in which:
the shaft comprises a hollow switching tube and a power circuit breaker contained in the hollow switching tube, the power circuit breaker having a set of contacts connected in series with the interconnection between the contact studs, the power circuit breaker being operable to open the contacts and disconnect the studs from each other.

2. In a breaker combination in accordance with claim 1 the further improvement comprising:
plural sets of power circuit breaker contacts in the switching tube, each set serving one phase of the bus bar installation.

3. In a breaker combination in accordance with claim 2 having contact studs for each phase of the bus bar installation, axially spaced apart on the switching tube, the further improvement comprising:
two contact studs for each phase disposed diametrically opposite each other on the switching tube, each such pair of contact studs being electrically interconnected via circuit breaking contacts.

4. In a breaker combination in accordance with claim 3, the further improvement comprising:
one of the two contact studs associated with each phase being electrically connected to, and axially spaced from, a grounding contact stud; and one grounded counter-contact for each phase being disposed on the inner periphery of the fixed tube and adapted for electrical connection, by rotation of the switching tube, to a grounding contact stud.

5. In a breaker combination in accordance with claim 4, further intended for use with a simplex bus bar and a branch, and comprising, for each phase, three counter-contacts, shaped as sector pieces and spaced about the circumference of the fixed tube from each other and from three additional counter-contacts, the further improvement comprising:
one counter-contact being connected to one phase of the bus bar, one counter-contact being connected to the corresponding phase of the branch, and one counter-contact being connected to ground; the length, the position of the counter-contacts, and the shape of the contact studs being so adjusted that, by appropriately positioning the switching tube and by closing the power circuit breaker, the branch may be connected to the bus bar or to ground, or the bus bar may connected to ground.

6. In a breaker combination in accordance with claim 4, for use with a duplex bus bar and a branch and having counter-contacts in the shape of sector pieces spaced apart from each other about the circumference of the fixed tube, the improvement comprising:
six counter-contacts for each phase, one counter-contact connected to a phase of the first bus bar, one counter-contact connected to the corresponding phase of the branch, and the three remaining counter-contacts being connected to ground, there being one grounded counter-contact lying between the counter-contact connected to the branch and each counter-contact which is connected to a bus bar, and a grounded counter-contact lying between counter-contacts which are connected to bus bars;
the length and position of the counter-contacts and the form of the contact studs being so related that, by appropriately positioning the switching tube, each phase of the branch may be connected with the corresponding phase of the first bus bar or of the second bus bar, or each phase of the first or second bus bar or of the branch may be connected with the associated, opposite, grounded counter-contact by closing the power circuit breaker.

7. In a breaker combination in accordance with claim 4, for use with a duplex bus bar and a branch and having counter-contacts, shaped as sector pieces, spaced apart from each other about the circumference of the fixed tube, the further improvement comprising:
five counter-contacts for each phase, one counter-contact connected to a phase of the first bus bar, one counter-contact connected to the corresponding phase of the second bus bar, one counter-contact connected to the corresponding phase of the branch, and two counter-contacts connected to ground, one of the grounded counter-contacts lying between the counter-contact connected to the first bus bar, and the other grounded counter-contact lying between the counter-contact connected to the branch and the counter-contact connected to the second bus bar;
the length and position of the counter-contacts and the form of the contact studs being so related that, by appropriately positioning the switching tube, each phase of the branch may be connected with a corresponding phase of the first bus bar, of the second bus bar, or of ground, or each phase of the first or second bus bar may be connected to ground by closing the contacts of the power circuit breaker, one contact stud of each pair of contact studs for each phase being formed as a sector piece and of such length, in the circumferential direction, that it can simultaneously connect the counter-contacts of both bus bars.

8. In a breaker combination in accordance with any one of claims 3, 4 and 5 in which the power circuit breaker further comprises:
- an insulated switching rod axially disposed in the switching tube and adapted for longitudinal motion therein;
- a connection between each contact stud and a fixed switching contact in the interior of the switching tube; and
- a contact bridge for each phase, carried on the switching rod, for contacting the fixed switching contacts associated with said phase.

9. In a breaker combination according to any one of claims 3 to 7 in which the power circuit breaker comprises:
- an insulated switching rod axially disposed in the switching tube and adapted for longitudinal motion therein;
- a movable switching contact for each phase fastened to the switching rod and electrically connected to one contact stud; and
- a fixed switching contact in the interior of the switching tube connected to another contact stud in the same phase and positioned to be contacted by the associated movable switching contact.

10. In a breaker combination in accordance with claim 8, the further improvement comprising:
- the switching tube being hermetically encapsulated and having a bellows through which the switching rod extends out of the switching tube.

11. In a breaker combination in accordance with claim 10, the further improvement comprising the switching tube being evacuated.

12. In a breaker combination in accordance with claim 9, the further improvement comprising the switching tube being encapsulated and having a bellows through which the switching rod extends out of the switching tube.

13. In a breaker combination in accordance with claim 12, the further improvement comprising the switching tube being evacuated.

14. In a breaker combination in accordance with any one of claims 4, 5 or 6, the further improvement comprising:
- a rotatably mounted actuating lug coupled to and extending axially out of the switching tube.

15. In a breaker combination in accordance with claim 14, the further improvement comprising:
- a switching rod extending out of the end of the switching tube away from the actuating lug and a coupling connected thereto which transmits only axial movements, the coupling being further connected to an actuating rod extending out of the fixed tube and mounted for displacement in the axial direction.

16. In a breaker combination in accordance with any one of the claims 4, 5 or 6, the further improvement comprising at least one of the fixed tube and switching tube being hermetically encapsulated and filled with $SF_6$ gas.

* * * * *